United States Patent [19]
Johnson et al.

[11] 4,031,178
[45] June 21, 1977

[54] STRENGTH IMPROVEMENT IN MACHINED SIC BODIES

[75] Inventors: Curtis A. Johnson; Svante Prochazka, both of Ballston Lake, N.Y.

[73] Assignee: General Electric Company, Schenectady, N.Y.

[22] Filed: Apr. 9, 1976

[21] Appl. No.: 675,618

[52] U.S. Cl. .................................. 264/65; 106/44; 264/67
[51] Int. Cl.² ........................................ C04B 35/56
[58] Field of Search ................. 106/44; 264/65, 67

[56] References Cited
OTHER PUBLICATIONS

Kriegel et al., Mechanical Property of Engineering Ceramics, pp. 340–341 (1961).

*Primary Examiner*—Robert F. White
*Assistant Examiner*—John Parrish
*Attorney, Agent, or Firm*—Jane M. Binkowski; Joseph T. Cohen; Jerome C. Squillaro

[57] ABSTRACT

A silicon carbide body with a density of at least 85% is machined to required specification and then fired at a temperature ranging from 1400° C to 2100° C in a firing atmosphere ranging in pressure from $10^{-3}$ torr to 25 torr to increase its fracture strength by at least 10%.

8 Claims, 2 Drawing Figures

STRENGTH IMPROVEMENT IN MACHINED SIC BODIES

The invention herein described was made in the course of or under a contract or subcontract thereunder (or grant) with the Department of the Navy.

The present invention relates to the treatment of polycrystalline silicon carbide bodies, particularly those that have been produced by sintering or hot-pressing processes, which have been machined. These polycrystalline SiC bodies are brittle and hard.

In certain applications of hard polycrystalline SiC bodies, for example, for structures such as bearing and attachment surfaces, material must be removed to accurately define the necessary dimensional tolerances. This material removal may include surface grinding, ultrasonic machining, lapping, etc. classified as abrasive machining techniques.

In the case of most silicon carbides, diamond abrasives are preferred. Diamond machining techniques, however, necessarily introduce surface damage in the body, which, depending on the degree of damage, will commonly decrease the fracture strength of the machined body.

According to the present invention, the fracture strength of a machined polycrystalline SiC body is increased by a vacuum firing of the specimen subsequent to the machining operation. The present firing of the SiC body at a temperature lower than the original forming temperature results in no additional shrinkage, therefore, the dimensional tolerances defined by the machining are maintained. Specifically, the present invention provides a means of increasing fracture strength after machining without dimensional change which is important in any application of SiC where machining, fracture strength and critical dimensional tolerances are necessary.

Those skilled in the art will gain a further and better understanding of the present invention from the detailed description set forth below, considered in conjunction with the figures accompanying and forming a part of the specification, in which:

FIG. 2 shows that the radii of curvature of the cracks have been enlarged significantly and rounded off.

Figure 1:
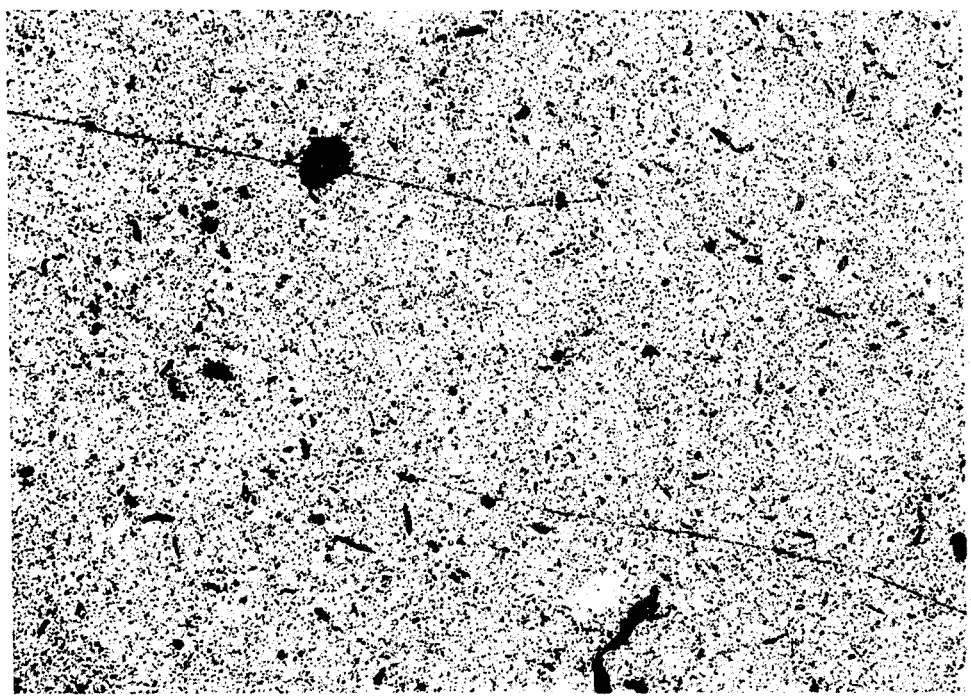
FIG. 1 is a photomicrograph (magnified 250 X) of a dense sintered SiC disk showing two thermally induced cracks in its surface.

Briefly stated, the present process comprises providing a polycrystalline silicon carbide body having a density of at least 85% and containing silicon carbide in an amount of at least 90% by weight of said body, removing a portion of said body by machining inducing surface irregularities which significantly limit the fracture strength thereof and firing said machined body in an atmosphere ranging in pressure from $10^{-3}$ torr to 25 torr wherein the residual gases have no significant deteriorating effect on said silicon carbide body at a firing temperature ranging from 1400° C to 2100° C to increase the fracture strength thereof at least 10% compared to that of the as-machined body.

Density given herein is the fractional density based on the theoretical density for silicon carbide of 3.21 gm/cc.

Fracture strength herein is tensile strength measured at room temperature in three-point bending.

In the present process the polycrystalline silicon carbide is ordinarily a hot-pressed or sintered body comprised of silicon carbide, i.e., it contains silicon carbide in an amount of at least 90% by weight and usually at least 95% by weight, and generally from 96 to 99% by weight, of the body. Any constituent or component of the present polycrystalline silicon carbide body other than silicon carbide must, in the present process, be chemically inert and undergo no significant melting or vaporization. Ordinarily, the present polycrystalline silicon carbide body contains boron, usually in an amount of at least about 0.3%, and generally up to about 3% by weight based on the silicon carbide. In addition, the present silicon carbide body has a density of at least 85%, and usually from about 90 to 98% or higher.

The present silicon carbide body can be prepared by sintering processes disclosed in copending Ser. Nos. 409,073 filed Oct. 24, 1973, 573,777 filed May 1, 1975, and 591,840 filed June 30, 1975, all in the name of Svante Prochazka and assigned to the assignee hereof, and by reference, all applications are incorporated herein.

Briefly stated, the sintered silicon carbide body can be prepared by providing a submicron particulate mixture of $\beta$-silicon carbide, boron additive and a carbonaceous additive which is free carbon or a carbonaceous organic material which is heat-decomposible to produce free carbon, and shaping the mixture into a green body. In an alternative method $\alpha$-SiC, submicron in size but with an average particle size twice that of $\beta$-SiC, is admixed with the particulate mixture in an amount of 0.05 to 5% by weight based on the $\beta$-SiC.

The green body is sintered at a temperature ranging from about 1900° C to 2300° C to produce a sintered body with a density of at least 85%. The sintering atmosphere should have no significant effect on the green body and the sintered product and can range from a substantial vacuum to superatmospheric pressure of 5 atmosperes. When sintering is carried out at atmospheric or higher pressure, the present firing process frequently results in a product with a fracture strength at least 10% greater than that of the as-sintered product.

Specifically, the boron additive may be in the form of elemental boron, boron carbide or a boron compound which decomposes at a temperature below sintering temperature to yield boron or boron carbide and gaseous products of decomposition and is used in an amount equivalent to 0.3 to 3.0% by weight of elemental boron based on the amount of silicon carbide. During sintering, the boron additive enters into solid solution with the silicon carbide, and when amounts of the additive in excess of that equivalent to about 1% by weight of elemental boron are used, a boron carbide phase also precipitates.

The carbonaceous additive is used in an amount equivalent to 0.1 by weight to 1.0% by weight of free carbon based on the amount of silicon carbide. The additive can be free carbon or a solid or liquid carbonaceous organic material which completely decomposes at a temperature of 50° C to 1000° C to submicron size free carbon and gaseous products of decomposition. Examples of carbonaceous additives are polymers of aromatic hydrocarbons such as polyphenylene or polymethylphenylene which are soluble in aromatic hydrocarbons.

The sintered body is comprised of silicon carbide and based on the amount of silicon carbide, from about 0.3 to about 3% by weight of boron and about 0.1 to about 1% by weight of free carbon. The boron is in solid solution with the silicon carbide or, alternatively, in solid solution with the silicon carbide and also present as a boron carbide phase. The free carbon is in the form of submicron particles dispersed throughout the sintered body.

Hot-pressed silicon carbide bodies can be prepared by processes disclosed in U.S. Pat. 3,853,566, copending Ser. No. 378,918 filed July 13, 1973 in the names of Svante Prochazka and William J. Dondalski, and in the name of Svante Prochazka copending Ser. Nos. 431,611 and 431,729 filed Jan. 8, 1974 and 632,481 filed Nov. 17, 1975, all assigned to the assignee hereof and all, by reference, are incorporated herein.

In one hot-pressing process, a dispersion of submicron powder of silicon carbide and an amount of boron or boron carbide equivalent to 0.5–3.0% by weight of boron, based on the silicon carbide, is hot-pressed at 1900°–2000° C under 5000–10,000 psi to produce a boron-containing silicon carbide body.

In another hot-pressing process, a submicron powder mixture of SiC, an amount of boron or boron carbide equivalent to 0.3–3.0% by weight boron and 0.5–3.0% by weight of elemental carbon or carbonaceous additive heat-decomposible to elemental carbon is hot-pressed at 1900° C–2000° C under 5000–10,000 psi to produce a boron-containing SiC body with elemental carbon interspersed throughout the body.

In still another hot-pressing process, a submicron dispersion of SiC, an amount of boron or boron carbide equivalent to 0.3–3.0% by weight of boron, and 3.5–10.0% by weight of silicon nitride is hot-pressed at a temperature of 1950° C–2050° C under 5000–10,000 psi to produce a boron-containing silicon carbide body with sufficient nitrogen atoms accommodated in the SiC lattice to make the body significantly electrically conducting.

In yet another hot-pressing process, a submicron powder mixture of SiC and 0.7–3.5% by weight of boron nitride is hot-pressed at 1950° C–2050° C under 5000–10,000 psi to produce an electrically conducting product.

Generally, in the hot-pressing processes either α-SiC or β-SiC or mixtures of α- and β-SiC are useful, and the hot-pressed product preferably ranges in density from about 98-100%.

Machining of the present SiC body induces surface irregularities such as sharp notches and cracks. It has been determined that it is the sharpness and size of these irregularities which lowers fracture strength. The present firing of the SiC body vaporizes SiC in very small amount from all surfaces exposed to the firing atmosphere, thus resulting in a weight loss during firing depending on the firing atmosphere pressure with the rate of SiC vaporization increasing with decreasing pressure at a given firing temperature, and specifically, such weight loss may range from about 100 micrograms to about 100 milligrams per square cm of surface. Such vaporization is sufficient to increase the radius of curvature of the irregularities thereby increasing strength.

In carrying out the present process, the machined silicon carbide body is fired in a medium vacuum ranging from $10^{-3}$ torr to 25 torr. Very high vacumms, i.e., pressures lower than $10^{-3}$ torr, provide no significant advantage and are difficult and expensive to attain. On the other hand, low vacuums, i.e., pressures significantly higher than 25 torr, are not useful since they require longer firing times for silicon carbide to vaporize sufficiently to improve fracture strength and longer firings coarsen the grain structure which would prevent strength improvement. For best results, the present firing atmosphere is a medium vacuum ranging in pressure from $10^{-2}$ torr to 1 torr.

Residual gases in the firing atmosphere should have no significant deteriorating effect on the silicon carbide body and representative of these residual gases is carbon monoxide, argon and helium.

Firing of the machined sintered body is carried out at a temperature ranging from about 1400° C to about 2100° C. Temperatures lower than 1400° C are not useful since they require firing times too long to be practical whereas temperatures higher than 2100° C coarsen the grain structure. Temperatures ranging from 1700° C–1900° C are preferred since they do not change the dimensions of the machined body, do not cause significant coarsening of the grain structure and do not require excessive firing times. To insure that the machined body undergoes no change in dimension in the present process, it should be fired at a temperature no higher than the temperature at which it was formed, sintered or hot pressed. Firing temperatures higher than that of the sintering or hot-pressing temperature of the SiC body may change the dimensions of the machined body but such change is not significant for applications other than those where critical dimensional tolerances must be met.

Firing time is determinable empirically and can range from a few minutes to about five hours, and in most instances, it ranges from about 10 minutes to 60 minutes, depending largely on firing temperature and pressure. Generally, longer firing times are required at lower firing temperatures and with higher pressures, i.e., lower vacuums.

As a result of the present invention, the fracture strength of the machined silicon carbide body is increased by at least about 10%, and frequently, it is increased by about 30%, depending on the degree or severity of the machining damage.

The invention is further illustrated by the following examples wherein all sintering and firing was carried out in a carbon-element resistor furnace.

All fracture strengths in the following examples were measured at room temperature in three-point bending on a one and one-half inch span.

EXAMPLE 1

A number of sintered SiC bars of substantially the same size were prepared in the same manner from the same particulate composition. Specifically, a charge of a homogeneous submicron powder mixture of β-SiC, and, based on the amount of SiC, about 1.0% by weight of elemental boron and 0.5% by weight of free carbon was pressed in a 0.2 inch × 2.0 inch rectangular bar die at 5000–6000 psi to produce a green bar about 0.2 inch thick. All of the resulting green bars were of substantially the same size and had a green density of about 55%.

The bars were sintered in a medium vacuum of 300 microns or 0.3 torr, wherein residual gases were chemically inert with respect to the material being sintered, for 20–30 minutes at 2080 ± 10° C resulting in final densities from 94 to 96% of theoretical. All of the sintered bars contained SiC in an amount of at least 95% by weight of the sintered body. The fracture strengths of the bars were measured and are shown in Table I.

Group 1 sintered bars were not machined and were tested in their as-sintered condition as control.

Group 2 sintered bars were diamond ground using a 325 grit diamond wheel removing 0.005 inch over each of the four sides.

Group 3 sintered bars were diamond-machined in the same manner as Group 2, and after machining, were fired at 2080° C ± 10° C for 20–30 minutes in a medium vacuum of 300 microns or 0.3 torr, wherein residual gases were chemically inert with respect to the material being fired.

TABLE I

| Group | Specimens | Treatment | Average Fracture Strength (Kpsi) |
|---|---|---|---|
| 1 | 33 | tested as-sintered | 94.3 |
| 2 | 10 | sintered and machined | 66.2 |
| 3 | 10 | sintered, machined and fired | 90.3 |

A comparison of Groups 1 and 2 of Table I shows that machining of the sintered SiC bars decreased the average fracture strength substantially due to the machining flaws remaining on the surfaces of the machined bars.

A comparison of Group 3, which illustrates the present invention, with Group 2 of Table I shows that the present firing process substantially increases fracture strength.

EXAMPLE 2

98 bars of sintered silicon carbide of substantially the same size were prepared from the same particulate composition in substantially the same manner as set forth in Example 1. The bars were sintered as set forth in Example 1 in the same manner resulting in final densities from 94 to 96% of theoretical. All of the sintered bars contained silicon carbide in an amount of at least 95% by weight of the sintered body. All of the sintered bars were diamond ground using a 325 grit diamond wheel removing 0.005 inch over each of the four sides. The average fracture strength of the Group 4 bars was then determined in the as-machined state and were used as controls as shown in Table II.

The remaining sintered bars which had been machined were fired in six groups of 12 and were used in Groups 5–10 of Table II. Specifically, the remaining groups of machined bars were fired for 20 minutes at the firing temperatures indicated in Table II in a medium vacuum of 300 microns or 0.3 torr wherein the residual gas was helium. The average fracture strength of each fired group was then determined and the results are shown in Table II.

TABLE II

| Group | Specimens | Firing Temperature (±10° C) | Average Fracture Strength (Kpsi) |
|---|---|---|---|
| 4 | 26 | machined and unfired controls | 81.0 |
| 5 | 12 | 950 | 88.3 |
| 6 | 12 | 1355 | 85.0 |
| 7 | 12 | 1645 | 88.8 |
| 8 | 12 | 1840 | 93.3 |
| 9 | 12 | 1935 | 90.0 |
| 10 | 12 | 2080 | 96.0 |

Groups 7–10 illustrate the present invention and show a significant increase in fracture strength over the average fracture strength of Group 4. The average fracture strength of Group 7 would have been higher if the firing period had been longer than 20 minutes or if a firing pressure lower than 0.3 torr had been used. In addition, Groups 5–9 showed no measurable change in dimensions.

EXAMPLE 3

A sintered SiC disk was prepared in substantially the same manner as set forth in Example 1. It had a density of about 95% and contained SiC in an amount of at least 95% by weight of the sintered body.

Figure 2:
FIG. 2 is a photomicrograph (magnified 250 X) of the same surface shown in FIG. 1 after the SiC disk had been fired in a medium vacuum in accordance with the present invention.

Two thermal cracks were induced in the surface of the disk by heating it to 900° c and impinging cold water thereon from a syringe and are shown in FIG. 1. This disk was then fired in a medium vacuum of 300 microns at 2080° C ± 10° C for 20 minutes wherein residual gases were chemically inert with respect to the material being fired. An examination of the resulting fired disk showed that the radii of curvature of the cracks were significantly enlarged as shown in FIG. 2. Elemental carbon was observed in the cracks as residue from decomposed SiC.

In copending U.S. Patent application, Ser. No. 675,575 (RD-8395) entitled "Furnace Atmosphere For Optimum Strength Of Sintered Silicon Carbide" filed of even date herewith in the names of Curtis A. Johnson and Svante Prochazka and assigned to the assignee hereof, and which by reference is made part of the disclosure of the present application, there is disclosed a process for producing a high-strength polycrystalline shaped silicon carbide body by sintering a shaped particulate silicon carbide green body at a temperature ranging from 1900° C to 2150° C in a vacuum ranging in pressure from $10^{-3}$ torr to 25 torr to produce a sintered body with a density of at least 85% and a fracture strength at least 10% higher than that attainable under the same conditions but at atmospheric pressure.

What is claimed is:

1. A method for increasing the fracture strength of a machined polycrystalline silicon carbide body having a density of at least 85% of the theoretical density of silicon carbide and containing silicon carbide in an amount of at least 90% by weight of said body, machining said body inducing surface irregularities which significantly limit the fracture strength thereof, and firing said machined body in an atmosphere ranging in pressure from about $10^{-3}$ torr to 25 torr wherein the residual gases have no significant deteriorating effect on said silicon carbide body at a temperature ranging from about 1400° C to 2100° C to increase the fracture strength thereof at room temperature by at least about 10% compared to that of the as-machined body, said body being free of constituent which are not chemically inert nor undergoe significant melting or vaporization at said firing temperature.

2. A method according to claim 1 wherein said pressure ranges from $10^{-2}$ torr to 1 torr.

3. A method according to claim 1 wherein said firing temperature ranges from 1700° C to 1900° C.

4. A method according to claim 1 wherein the density of said silicon carbide body ranges from 90 to 100%.

5. A method according to claim 1 wherein said residual gases are selected from the group consisting of carbon monoxide, argon and helium.

6. A method according to claim 1 wherein said polycrystalline silicon carbide body is a sintered body.

7. A method according to claim 1 wherein said polycrystalline silicon carbide body is a hot-pressed body.

8. A method according to claim 1 wherein said fracture strength is increased from about 10 to 30%.

* * * * *